(12) United States Patent
Brost et al.

(10) Patent No.: US 9,959,647 B1
(45) Date of Patent: May 1, 2018

(54) REPRESENTATION OF ACTIVITY IN IMAGES USING GEOSPATIAL TEMPORAL GRAPHS

(71) Applicants: Sandia Corporation, Albuquerque, NM (US); David R. Strip, Albuquerque, NM (US)

(72) Inventors: Randolph Brost, Albuquerque, NM (US); William C. McLendon, III, Albuquerque, NM (US); Ojas D. Parekh, Albuquerque, NM (US); Mark Daniel Rintoul, Albuquerque, NM (US); Jean-Paul Watson, Albuquerque, NM (US); David R. Strip, Albuquerque, NM (US); Carl Diegert, Washington, DC (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 317 days.

(21) Appl. No.: 14/848,165

(22) Filed: Sep. 8, 2015

(51) Int. Cl.
*G06K 9/00* (2006.01)
*G06T 11/60* (2006.01)
(Continued)

(52) U.S. Cl.
CPC .......... *G06T 11/60* (2013.01); *G06K 9/0063* (2013.01); *G06K 9/6267* (2013.01); *G06T 5/30* (2013.01);
(Continued)

(58) Field of Classification Search
CPC ......... G06T 11/60; G06T 5/30; G06T 7/0085; G06T 7/0091; G06T 7/608;
(Continued)

(56) References Cited

U.S. PATENT DOCUMENTS 7,711,146 B2 * 5/2010 Tu ...................... G06K 9/00295
348/143
8,358,808 B2 * 1/2013 Malinovskiy ...... G06K 9/00785
340/903

(Continued)

OTHER PUBLICATIONS

Brost, Randolph C., et al. Temporal Analysis and Change Detection via Geospatial-Temporal Semantic Graphs. No. SAND2014-1361C. Sandia National Laboratories (SNL-NM), Albuquerque, NM (United States), 2014.*

(Continued)

*Primary Examiner* — Jonathan S Lee
(74) *Attorney, Agent, or Firm* — Medley, Behrens & Lewis, LLC

(57) ABSTRACT

Various technologies pertaining to modeling patterns of activity observed in remote sensing images using geospatial-temporal graphs are described herein. Graphs are constructed by representing objects in remote sensing images as nodes, and connecting nodes with undirected edges representing either distance or adjacency relationships between objects and directed edges representing changes in time. Activity patterns may be discerned from the graphs by coding nodes representing persistent objects like buildings differently from nodes representing ephemeral objects like vehicles, and examining the geospatial-temporal relationships of ephemeral nodes within the graph.

17 Claims, 12 Drawing Sheets

(51) Int. Cl.
*G06T 7/60* (2017.01)
*G06T 7/00* (2017.01)
*G06K 9/62* (2006.01)
*G06T 5/30* (2006.01)

(52) U.S. Cl.
CPC .......... *G06T 7/0085* (2013.01); *G06T 7/0091* (2013.01); *G06T 7/608* (2013.01); *G06T 2207/10004* (2013.01); *G06T 2207/10044* (2013.01); *G06T 2207/20036* (2013.01); *G06T 2207/30232* (2013.01)

(58) Field of Classification Search
CPC . G06T 2207/10004; G06T 2207/20036; G06T 2207/30232; G06K 9/0063; G06K 9/6267
See application file for complete search history.

(56) References Cited

U.S. PATENT DOCUMENTS

| | | | | |
|---|---|---|---|---|
| 9,076,259 | B2* | 7/2015 | Hourie | G06F 17/30241 |
| 9,727,976 | B1* | 8/2017 | Perkins | G06T 7/2026 |
| 2005/0265582 | A1* | 12/2005 | Buehler | G06K 9/00335 |
| | | | | 382/103 |
| 2010/0046842 | A1* | 2/2010 | Conwell | G06F 17/30265 |
| | | | | 382/218 |
| 2013/0063489 | A1* | 3/2013 | Hourie | G06F 17/30241 |
| | | | | 345/643 |

OTHER PUBLICATIONS

Benediktsson, Jon Atli, Martino Pesaresi, and Kolbeinn Amason. "Classification and feature extraction for remote sensing images from urban areas based on morphological transformations." IEEE Transactions on Geoscience and Remote Sensing 41.9 (2003): 1940-1949.*
Liu, Xiaobai, et al. "Trajectory parsing by cluster sampling in spatio-temporal graph." Computer Vision and Pattern Recognition, 2009. CVPR 2009. IEEE Conference on. IEEE, 2009.*
Brost, et al., "A Computational Framework for Ontologically Storing and Analyzing Very Large Overhead Image Sets", In 3rd ACM SIGSPATIAL International Workshop on Analytics for Big Geospatial Data (BigSpatial), 2014, pp. 1-10.
Fekete, et al., "Geometric Hitting Set for Segments of Few Orientations", In Approximation and Online Algorithms, Springer International Publishing, 2015, pp. 1-2.
Ray, et al., "Jackpine: A Benchmark to Evaluate Spatial Database Performance", In Data Engineering (ICDE), 2011 IEEE 27th International Conference on IEEE, 2011, 12 pages.
Doan, et al., "Learning to Map Between Ontologies on the Semantic Web", In Proceedings of the 11th International Conference on World Wide Web, ACM, May 7, 2002, 12 pages.
Passino, et al., "Aspect Coherence for Graph-Based Semantic Image Labelling", May 25, 2009, 29 pages.
Strip, David, "Source Agnostic Fusion Through Geospatial/Temporal Semantic Graphs", Sep. 26, 2012, 26 pages.
Brost, et al., "Geospatial-Temporal Remote Sensing Analysis Using Semantic Graphs", Project No. SL12-DeltaSpaceTime-PD06, Jan. 16, 2013, 1 page.
Watson, et al., "Verification, Monitoring, and Remote Detection (VMRD2012) Joint Program Review Meeting", In Sandia Unclassified Unlimited Release, May 15, 2012, 31 pages.
Brost, Randy C., "A Computational Framework for Ontologically Storing and Analyzing Very Large Overhead Image Sets", In Sandia Unclassified Unlimited Release UUR SAND 2014-19280C, Nov. 4, 2014, 86 pages.
Brost, et al., "Thoughts on Multi-Modality Data Analysis", In Sandia Unclassified Unlimited Release UUR SAND 2015-1124C, Mar. 2, 2015, 10 pages.
Brost, Randy C., "Nuclear Weaponization and Material Production Detection Review Meeting", In Sandia Unclassified Unlimited Release UUR SAND 2014-2656C, Apr. 29, 2014, 44 pages.
Brost, et al., "Computing Quality Scores and Uncertainty for Approximate Pattern Matching in Geospatial Semantic Graphs", In Sandia Power Point Presentation at Conference on Data Analysis, SAND 2014-1753P, 2014, 1 page.
Brost, Randy C., "Geospatial-Temporal Semantic Graphs for Remote Sensing Data Analysis", In Sandia Unclassified Unlimited Release UUR SAND 2015-5935 PE, Jul. 23, 2015, 78 pages.
Brost, et al., "LDRD Final Report: First Application of Geospatial Semantic Graphs to SAR Image Data", In Sandia Report SAND2013-0724, Jan. 2013, 65 pages.
Brost, et al., "Image-Based Algorithms—Semantic Graph Algorithms", In Sandia Unclassified Unlimited Release UUR SAND 2015-2228C, Apr. 29, 2015, 1 page.
"Pattern Analytics to Support High-Performance Exploitation and Reasoning", In Sandia Power Point on Laboratory Directed Research and Development Data-to-Decision Grand Challenge, SAND 2013-3298A, Apr. 25, 2013, 3 pages.
Brost, et al., "Approximate Pattern Matching Under Uncertainty in Geospatial Semantic Graphs", In Sandia Power Point on PANTHER DA Uncertainty, Mar. 7, 2014, 35 pages.
Watson, et al., Encoding and Analyzing Aerial Imagery Using Geospatial Semantic Graphs, In Sandia Report SAND2014-1405, Feb. 2014, 30 pages.

* cited by examiner

REPRESENTATION OF ACTIVITY IN IMAGES USING GEOSPATIAL TEMPORAL GRAPHS

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Remote sensing data, including high-resolution imagery from aircraft- and spacecraft-based surveillance and imaging systems, is now being used for purposes ranging from meteorological observation to military surveillance. Large remote sensing datasets are being collected that represent information about large geographical regions with many different features of interest. Current machine-assisted search techniques primarily rely on defining searches over particular image pixel characteristics to identify these features within a larger dataset. These techniques often fail to capture semantically relevant patterns in the data, especially over time.

SUMMARY

The following is a brief summary of subject matter that is described in greater detail herein. This summary is not intended to be limiting as to the scope of the claims.

Various technologies for the representation and display of geospatial-temporal (GST) feature activity in remote sensing data using graph representations are described herein. In an example, a computing system is used to generate pre-processed images of a scene based on remote sensing image data, and to generate graph representations of the activity objects depicted in the scene based upon the GST relationships between these objects that are observed in the pre-processed images. The pre-processed images encode categorization data that identifies and classifies various regions of the image corresponding to certain objects or types of objects. Graph nodes can then be assigned to the categorized regions of the pre-processed image. In the graph, nodes can represent various features indicative of activity in the images, for example the presence of vehicles, vehicle or other tracks, etc., and can be encoded with information describing when in time the activity features appeared in the image dataset. Other nodes can represent features expected to be persistent through time, for example buildings, trees, roads, etc. The relationships between nodes in the graph are described by graph edges which are either undirected or directed edges. Geospatial relationships between features, e.g., distance, are represented by undirected edges while temporal relationships such as change over time are represented by directed edges. Such a GST graph can be used to quickly and efficiently search for signs of activity of non-persistent objects in an image dataset.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
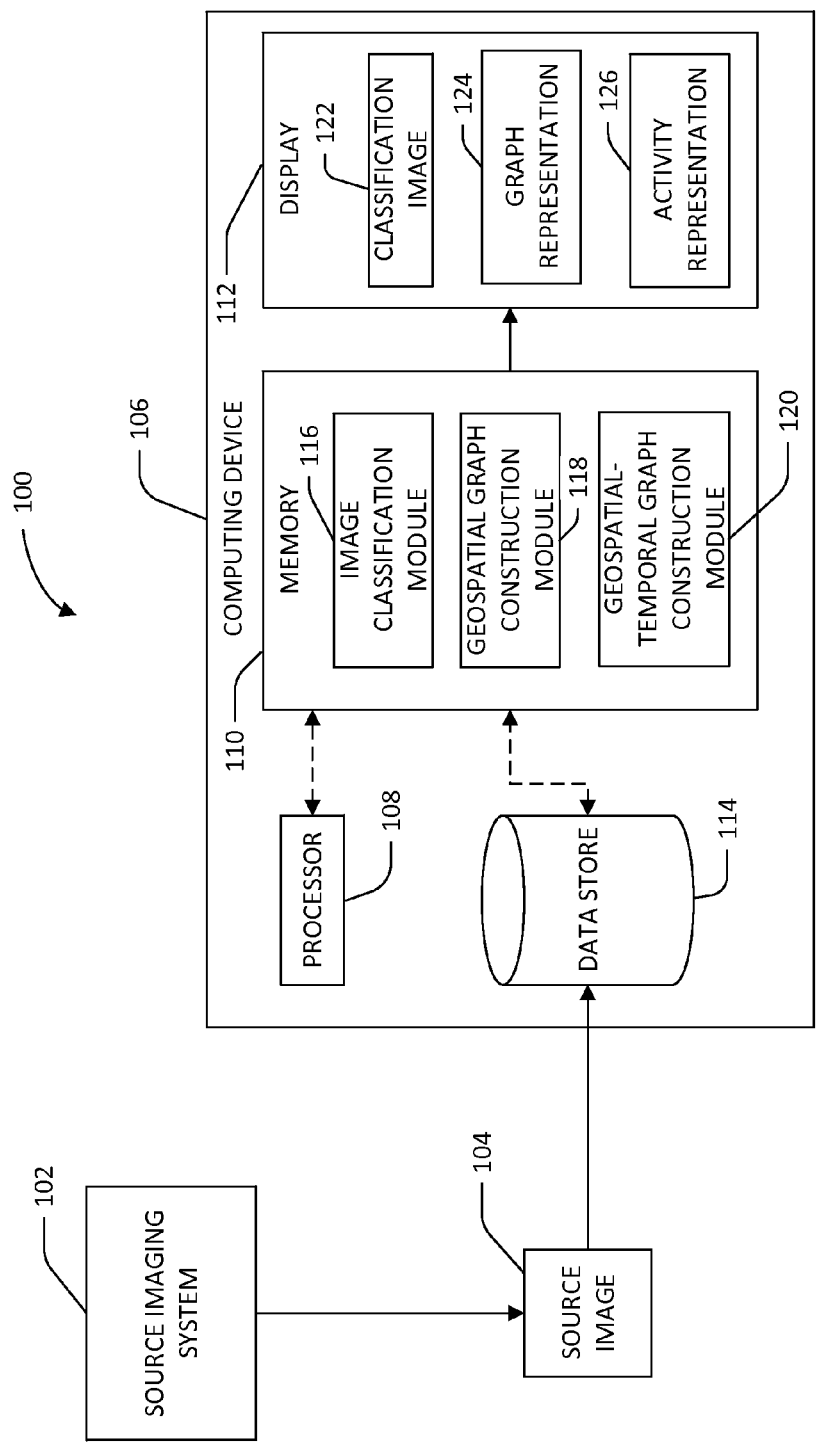
FIG. 1 is a functional block diagram of an exemplary system that facilitates generating and displaying GST graph representations of activity of objects in images.

Various technologies pertaining to using GST graphs to represent activity captured by remote sensing datasets are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates generating and displaying GST graph representations of activity in remote sensing data is illustrated. The system 100 includes a source imaging system 102 that generates a source image 104 and a computing device 106 that generates graph representations of data from the source image 104. The source imaging system 102 can be any system that is capable of generating a source image from remote sensing data. In an example, the source imaging system 102 can be an aircraft-mounted synthetic aperture radar (SAR) imaging system. In another example, the source imaging system 102 can be an imaging system that captures RGB+IR images.

The computing device 106 comprises a processor 108, a display 112, a data store 114, and memory 110 comprising instructions that are executed by the processor 108. The memory 110 comprises an image classification module 116, a geospatial graph construction module 118, and a GST graph construction module 120. The image classification module 116, when executed by the processor 108, receives a source image 104 from the data store 114 and conducts pre-processing operations to generate a classification image 122 by classifying regions of a scene corresponding to different objects depicted in the source image 104 into one of several categories, e.g., structures, vegetation, etc., as described in greater detail below with respect to FIG. 3. The image classification module 116 can then cause the classification image 122 to be presented on a display 112 for user analysis and review. The geospatial graph construction module 118 then creates a geospatial graph representation of the relative position of the objects depicted in the scene that were categorized by the image classification module 116. In the geospatial graph, nodes represent objects in the scene, and undirected edges between nodes represent symmetric relationships, such as the distance between disjoint objects, the overlap area common to overlapping objects, or that the objects are immediately adjacent to one another in the scene. The geospatial graph also may comprise directed edges between nodes, representing asymmetric relationships such as "is north of" or "is half size of." Thus, a directed edge pointing from a first node to a second node can indicate that an object represented by the first node is "north of" an object represented by the second node. The geospatial graph construction module 118 can cause a graph representation 124 to be presented on the display 116 for user examination and review, wherein the graph representation 124 may be a pictorial graph, a text-based presentation of the nodes and their associated edges, etc.

Responsive to receiving multiple source images of the same scene from the source imaging system 102 (e.g., with associated time information for each image), the computing device 106 can generate graphs that incorporate data and representations of temporal change in the scene from the time at which a first source image was collected to the time at which a second source image was collected. Temporal changes can be changes in the position of an object depicted in a source image, a change in size or shape of a region in a classification image, a change in the ground cover category of a region in a classification image, etc. The GST graph construction module 120 can generate pure temporal graphs or GST graphs that encode both distance and temporal change relationships by taking data directly from the image classification module 116, or can generate these graphs by processing data from multiple geospatial graph representations of the scene. A temporal graph representation of a scene includes nodes corresponding to categorized objects in the scene and directed edges showing a change from one node to another from the time of the first image to the time of the second image. A GST graph additionally includes undirected edges connecting nodes that encode the distance and/or overlap between the objects represented by the nodes or that the two objects are immediately adjacent to one another in an image, as discussed above with respect to pure geospatial graphs. A pure temporal or GST graph or a portion of such graph can also be presented as a graph representation 124 on the display 112 for user examination and review.

The GST graph construction module 120, when generating GST graph representations of a scene, can distinguish between objects indicative of activity (e.g., vehicle tracks) or potentially exhibiting activity (e.g., vehicles), and objects that are expected to persist over time (e.g., buildings and roads). Objects that are indicative of activity can be referred to as "activity objects," which can be represented by activity nodes in a GST graph. A node representing an activity object can be assigned a label that indicates that the node may be representative of an activity. For instance, a node representative of a vehicle can be assigned a label that indicates that the node potentially represents an activity of driving or moving. Likewise, a node representative of vehicle tracks can be assigned a label that indicates that the node potentially represents an activity of driving or moving. Generally, such labels can be assigned by the classification module, which determines the type of each scene object. Some types found (such as vehicles or vehicle tracks, for example), can appear and disappear, change locations, or otherwise change over time. Subsequently, the GST graph can be queried for activities. Additionally, the GST graph can be queries for static objects (e.g., to identify high school campuses in a scene, to identify oil refineries in a scene, etc.). Nodes representing activity objects are assigned as "ephemeral" nodes, while nodes representing persistent objects are assigned as "durable" nodes. Ephemeral nodes may be used to represent objects in the scene which are not expected to remain the same over time. This is the case for activity objects, and also for natural objects that do not persist, such as clouds. It is to be understood that the term "object indicative of activity" is meant to include such natural ephemeral objects as well. A representation of activity 126 in an image may be generated based upon a GST graph, and can be presented on the display 112 for review by an analyst or other user.

The nodes in a GST graph can be assigned values from numerous sources. Exemplary values include positional values ascertained from imagery (e.g., optical imagery, radar imagery, etc.). Further, nodes in a GST graph can arise from and be assigned values from external sources, such as online maps (e.g., latitude/longitude coordinates), identities (e.g., business names), street addresses, and so forth. With more particularity, external sources may be non-image sources, such as a database that comprises rows and columns. For instance, a database can include a plurality of rows, wherein each row comprises an identity of a business, a corresponding street address, latitude/longitude coordinates, and potentially other metadata. The GST graph can include nodes that are respectively representative of rows of the database, where each node is assigned values found in entries in a corresponding database row.

Figure 2:
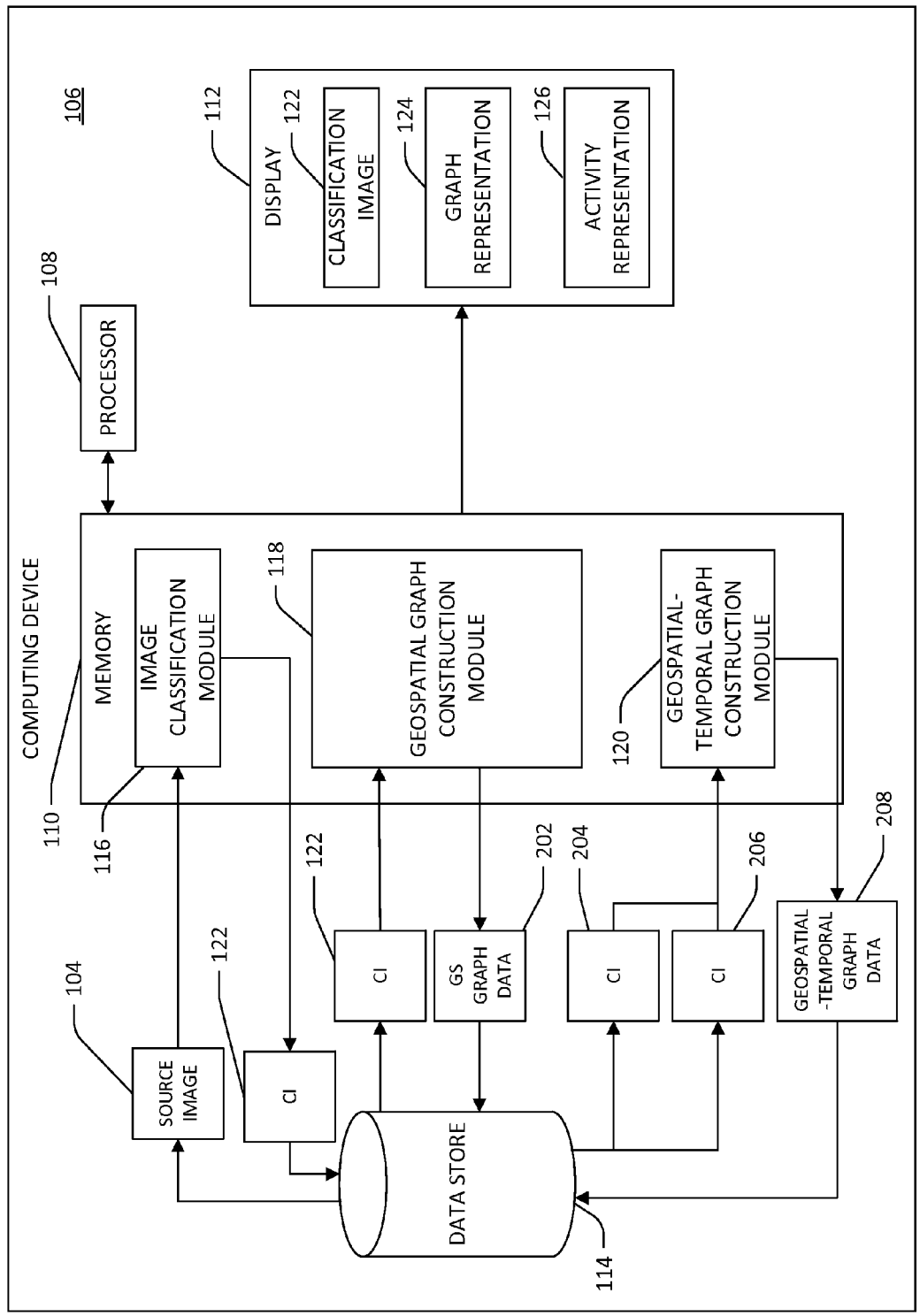
FIG. 2 is a functional block diagram of an exemplary computing device that facilitates generating GST graphs.

Referring now to FIG. 2, the exemplary computing device 106 is shown in greater detail to illustrate the operation of the modules in memory. As discussed above, the computing device 106 comprises the processor 108, the data store 114, the display 112, and memory 110 comprising instructions that are executed by the processor 108. In the exemplary device illustrated, the input and output data of each of the modules in memory is retrieved from and stored in the data store 114. The data store 114 facilitates long-term storage of remote sensing data, classification images, and graph representations that may be too large to practicably retain in memory 110.

The image classification module 116 generates a classification image 122 as output from an input source image 104 comprising remote sensing data of a scene. In an example, the image classification module 116 can assign different colors to different portions of a classification image, the colors corresponding to the type of object depicted in the input source image 104. The input source image 104 may be one or several images comprising data that may be used to generate a suitable classification image of the scene. In an example, the source image 104 includes RGB+IR imagery, LiDAR or digital surface model (DSM) data, and GIS road data to provide a detailed model of land cover of the scene that is capable of distinguishing between buildings, trees, low vegetation such as grass and shrubs, roads, other pavement, bare earth, and water. DSM data refers to a model of heights of top surfaces, measured either in absolute elevation or relative to ground level. Thus, DSM data broadly refers to any suitable data included in a height model of a scene. In the example, LiDAR and/or DSM data can be used by the image classification module 116 to construct a normalized digital surface model (nDSM) of the scene showing elevation of objects in the scene above ground. Objects in the scene can then be categorized as either "tall" or not relative to the ground, where tall refers to objects the size of trees or buildings (e.g., 2 meters or more). Among tall objects, trees and buildings can be differentiated using a normalized difference vegetation index (NDVI) computed from the RGB+IR image by the image classification module 116. Among the "short" objects, low vegetation can also be identified using the NDVI. Remaining objects, such as dirt, pavement, and water may be differentiated based on spectral, geometric, and other contextual properties. Among the set of objects classified as pavement, roads can be distinguished using GIS road data. While the example described above provides one approach to generating classification images, it is to be understood that any other input imaging data, for example SAR data, may be used to generate classification images using any image processing methods capable of distinguishing among different object types at a high level.

Figure 3:
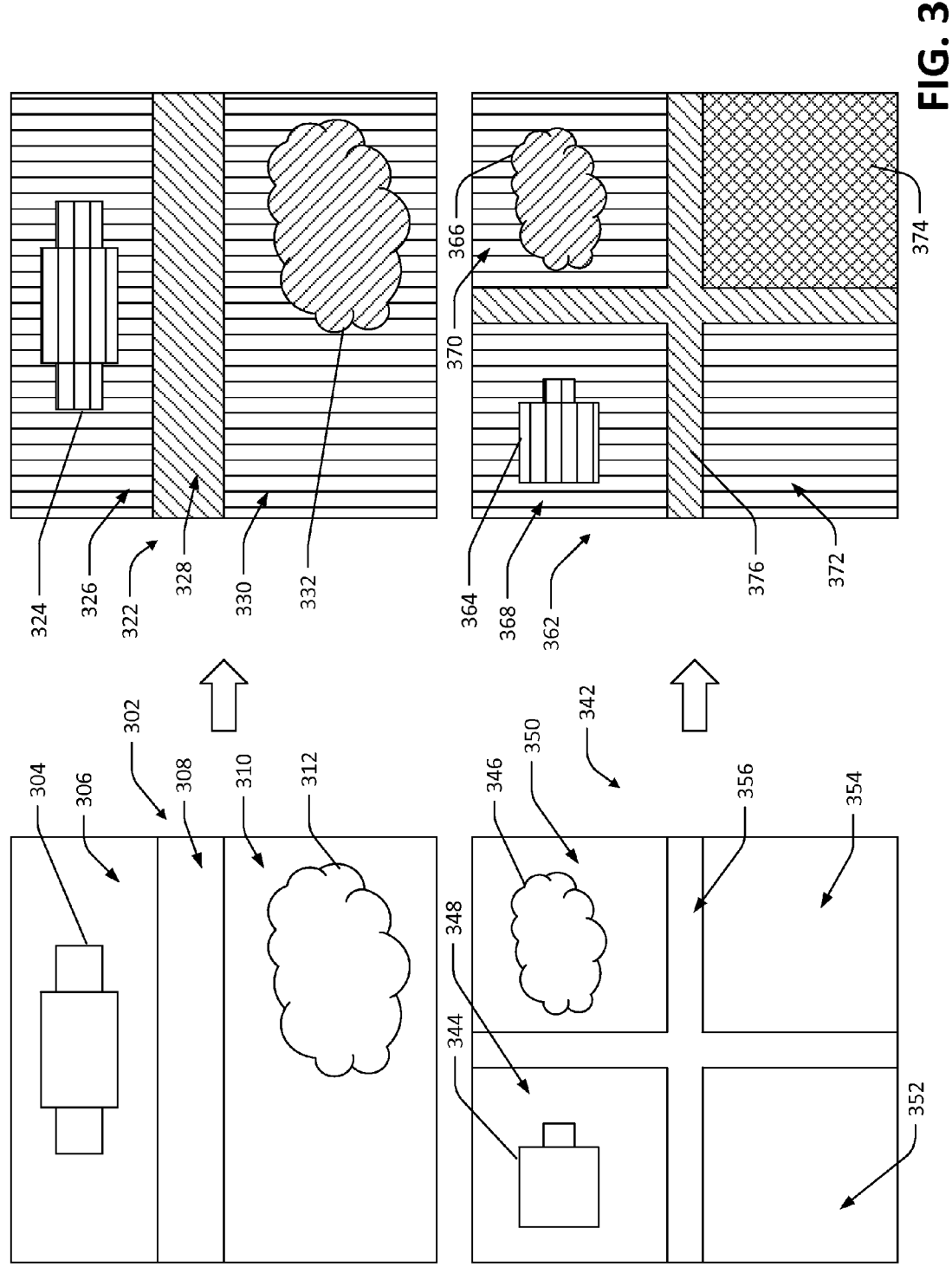
FIG. 3 is an exemplary illustration of the generation of classification images of a scene.

Referring to FIG. 3, an example illustration of the results of the classification module is shown. Two input images 302 and 342 are shown along with their corresponding classification images 322 and 362. The first input image 302 is of a first scene comprising a building 304 surrounded by a first grass field 306, a road 308, and a second grass field 310 surrounding a tree 312. The corresponding first classification image 322 depicts the same scene, wherein different regions are shaded according to their classification. In an example, the shading of different regions in the classification image 322 may comprise displaying the different regions in different colors to facilitate human analysis. The shaded region 324 corresponding to the building 304, the region 328 corresponding to the road 308, and the region 332 corresponding to the tree 312 are each shown with different shading according to their classifications as structures, road pavement, and tall vegetation, respectively. The region 326 corresponding to the first grassy field 306 and the region 330 corresponding to the second grassy field 310 are depicted with the same additional type of shading, indicating that they both belong to the low vegetation classification.

Referring still to FIG. 3, the second input image 342 depicts a scene comprising a house 344, a tree 346, a first grassy field 348, a second grassy field 350, a third grassy field 352, a first dirt field 354, and a road 356. The corresponding second classification image 362 likewise depicts the same scene with regions shaded according to their classification. The region 364 corresponding to the house 344, the region 366 corresponding to the tree 346, and the region 376 corresponding to the road 356 are shaded differently according to their classifications. The regions 368, 370, and 372 corresponding to the three grassy fields 348, 350, and 352 are each assigned the same additional type of shading. The region 374 corresponding to the dirt field 354 is assigned yet another type of shading because, although it represents an open field, the classification module in the example embodiment is capable of distinguishing between grass and dirt.

Referring now again to FIG. 2, the classification image 122 generated by the image classification module 116 is categorized by region as described above with respect to FIG. 3. Classification images generated by the image classification module 116 are held in the data store 114 for later retrieval by the processor 108 upon execution of the instructions of the geospatial graph construction module 118 or the GST graph construction module 120. A classification image 122 may also be presented on a display 112 so that a user may examine the image classification to ensure its accuracy. Pointers to the original raw image data are included in the classification image 122 to facilitate this user interaction.

The geospatial graph construction module 118 constructs a geospatial graph 202 based on the classification image 122. Each shaded or colored region of the classification image 122 corresponds to an object depicted in the source image 104 and is assigned a node in the geospatial graph 202 encoded with various data about the region, for example its ground cover category identified by the classification module, size, centroid, perimeter, aspect ratio, etc. These data also include pointers to the raw source image 104 data represented by the graph. In the geospatial graph 202, distance or adjacency relationships between nodes are represented by undirected edges connecting the nodes. The geospatial graph 202 thus encodes data about the relative location of objects in the scene depicted in the source image 104 in a form that can be searched and analyzed through a process of human-machine interaction, or fully automated machine calculation.

Figure 4:
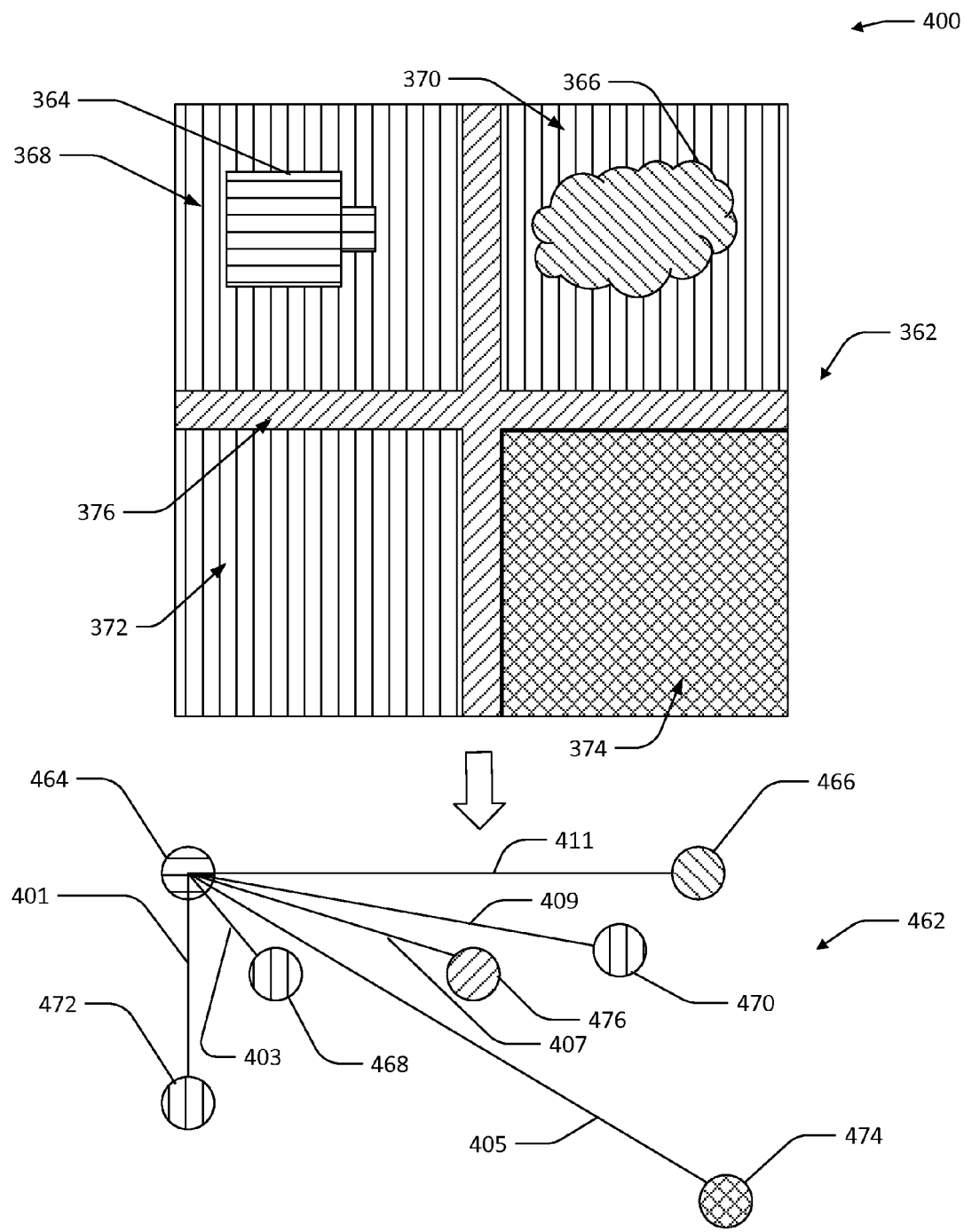
FIG. 4 is an exemplary illustration of a geospatial graph representation of a classification image.

FIG. 4 is an example illustration 400 of a partial geospatial graph representation 462 of a scene depicted in the classification image 362. The partial graph 462 illustrated includes nodes 464-474 representing each of the categorized regions 364-374 and undirected edges 401-411 connecting the nodes 464-474. Each undirected edge has an attribute corresponding to the distance between the regions in the classification image 362 represented by the connected nodes. For example, the geospatial relationship between the structure category region 364 and the dirt field category region 374 in the categorization image 362 is given by the structure category node 464, the dirt field category node 474, and the edge 405 connecting them that describes the distance between them. In the example illustration 400, the partial graph 462 shows only the undirected edges connected to the structure category node 464, which corresponds to the region 364 representing the house 344.

A complete geospatial graph of the scene depicted in the classification image 362 would include additional undirected edges connecting each node to every other node, fully describing the distance relationships of all regions in the classification image 362. In an embodiment, a stored graph of a remote sensing image dataset that includes all distance edges between nodes is kept in a data store to be searched later responsive to a search query. It is to be understood, however, that the geospatial graph construction module 118 as shown in FIG. 2 need not construct a complete graph of a classification image. When image datasets are very large, for example if an entire city is depicted in an image, it may be computationally impractical to construct all possible graph edges. A subset of graph edges may be computed by the geospatial graph construction module 118 to construct a partial graph responsive to receiving a graph search query defining particular nodes or relationships of interest. For example, if a user is interested in determining the shortest distance to a road from every structure in an image, the graph construction module 118 need not construct edges between grassy fields and bodies of water. Further, in the same example, constructing the edges between every road segment and every structure might not be necessary to solve the problem if it is known that roads beyond a certain maximum distance from structures are of no interest. Referring to FIG. 2, the graph construction module 118 can generate a complete node representation of the classification image 122 which can be stored as geospatial graph data 202 in the data store 114. The graph construction module 118 can then construct graph edges on demand at a later time, responsive to receiving graph search queries from users, and can update the graph with the computed edges, so that they may be re-used by later queries without recomputation. The construction of a geospatial graph can therefore be an iterative process in which the graph is continually updated in response to search queries.

Referring now yet again to FIG. 2, the GST graph construction module 120 shown constructs GST graphs responsive to receiving multiple classification images 204-206 of the same scene at different times. The GST graph allows a single graph representation to incorporate the concept of change over time by using directed edges to represent a change in time from one node to another. Two nodes connected by a directed edge may represent the same object depicted in two source images that changed position, size, shape, etc. Nodes connected by a directed edge may also represent different objects entirely. For example, a structure node representing a building seen at one time may be connected to a vegetation node representing a grass field seen at a second time where the building once stood. The GST graph construction module 120 identifies such changes in classification regions from one classification image 204 to another 206, and computes directed edges accordingly to represent these changes.

Figure 5:
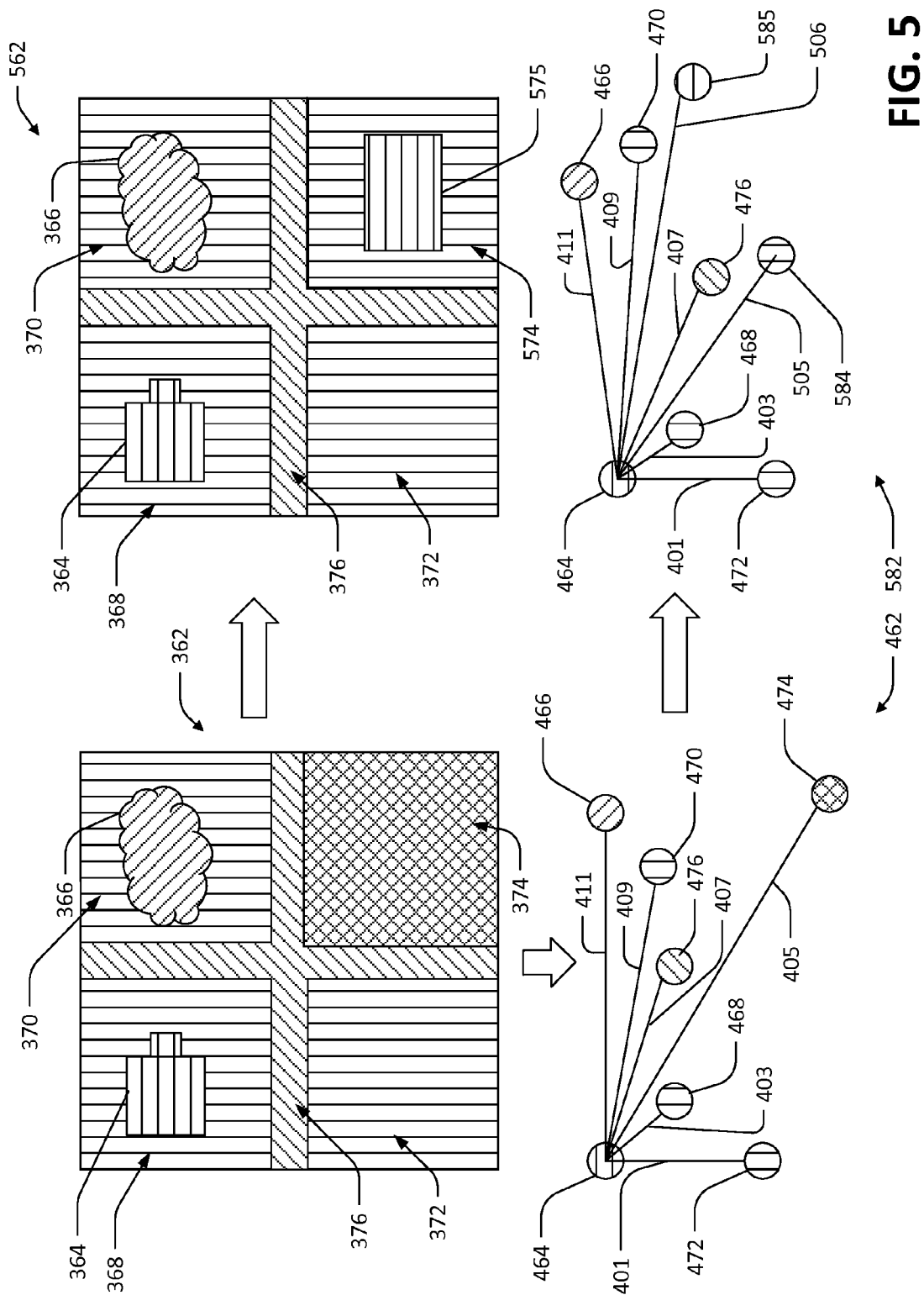
FIG. 5 is an exemplary illustration of a representation of temporal change in multiple geospatial graphs

FIG. 5 illustrates an example of these changes in a set of classification images and their corresponding geospatial graph representations. FIG. 5 depicts a first classification image 362 and a second classification image 562 each showing the same scene at a different time. The first classification image 362 and the geospatial graph 462 are as shown and described in FIG. 4. The second classification image 562 shows a change in the scene from a dirt field 374 in the lower right quadrant to a grass field 574 and a structure 575 of some sort. The geospatial graph representation 582 of the second image 562 has a node 584 corresponding to the new grass field region 574 and a node 585 corresponding to the new structure region 575 that together have replaced the node 474 corresponding to the dirt field region 374. Likewise, the geospatial graph 582 of the second image 562 has a new edge 505 that has as its attribute the distance between the region 464 and the new grass field region 574 and a new edge 506 having as its attribute the distance between the region 464 and the new structure region 575 in the second classification image 562. The remaining nodes 464-472, 476 and edges 401-403, 407-411 are the same in the new graph since the regions and distances they represent have not changed from the first classification image 362 to the second classification image 562.

Figure 6:
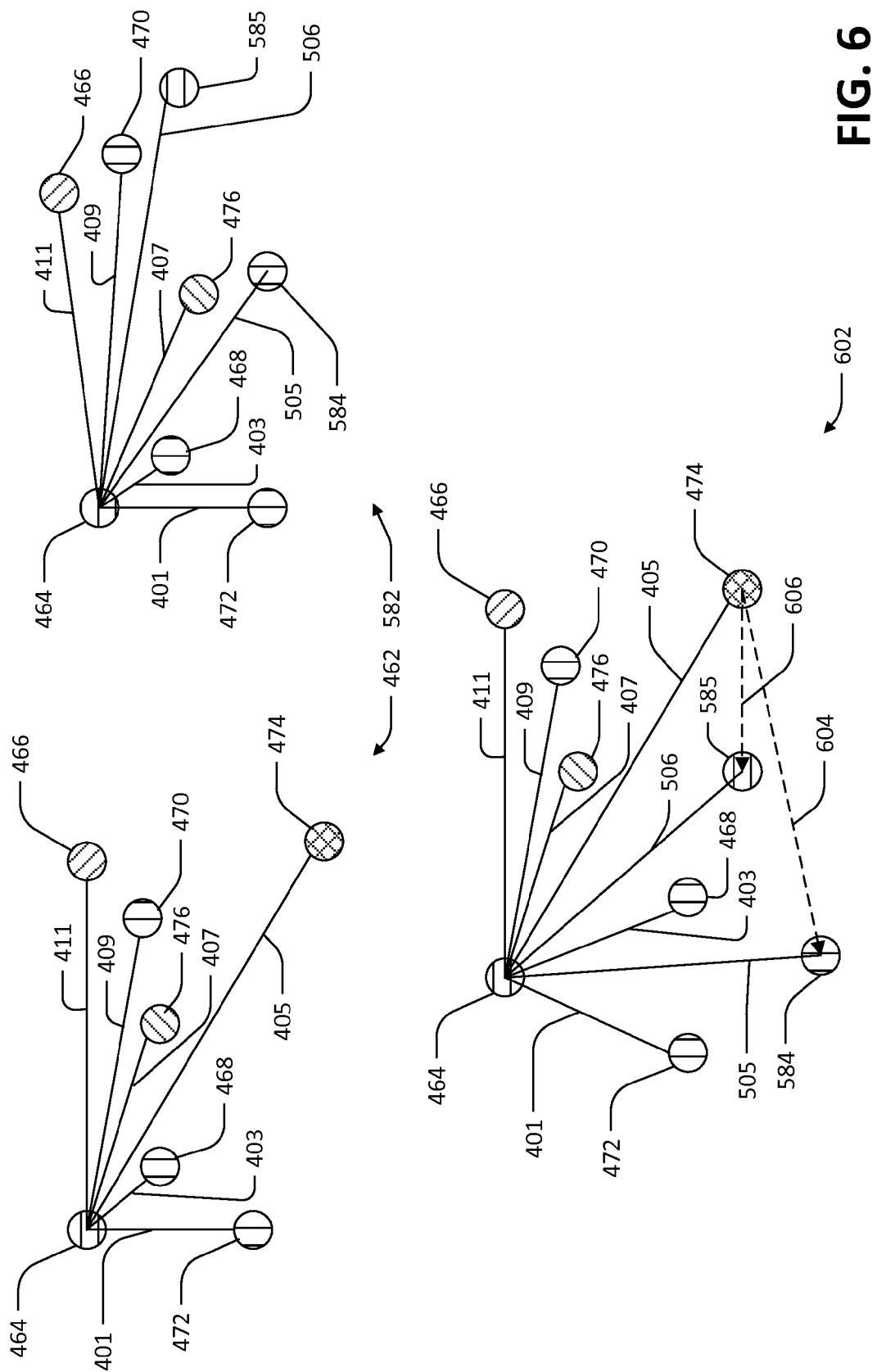
FIG. 6 is an exemplary illustration of a GST graph representation based upon two geospatial graphs representing the same scene at two different times.

FIG. 6 illustrates how the changes from the first geospatial graph 462 to the second geospatial graph 582 can be represented instead as a single GST graph 602 by adding directed edges 604-606 to the graph representation scheme. In the GST graph 602, nodes 464-476, 584-585 continue to represent regions of the classification images and undirected edges 401-411, 505-506 continue to represent a spatial distance relationship between nodes. The directed edges 604-606 represent the change of the region represented by node 474 from the time of the first image to the time of the second image. The dirt field node 474 is shown as changing to a structure node 585 and a grass field node 584, reflecting the change in the classification images 362, 562 in FIG. 5 of the dirt field region 374 to the structure region 575 and the grass field region 574. The undirected edges 505-506 connecting the new nodes 584-585 to the node 464 represent the distance relationship between the nodes 584-585 and the node 464 at the time of the second observation. The remaining nodes 466-472 and 476 not connected to any other node by a directed edge continue to have the same distance relationships to 464, and so their undirected edges are unchanged.

Unlike the nodes in a geospatial graph, the nodes in a GST graph are encoded with a time attribute by the GST graph construction module 120. This attribute allows information about when an object was seen to exist or not exist to be encoded into the graph itself. The time attribute can be represented by two ordered pairs with the following representation scheme:

$$t_{node} = (t_{last\ absent}, t_{first\ seen})[t_{last\ seen}, t_{first\ absent})$$

The first element, $t_{last\ absent}$, is the time of the latest observation in which the node was seen not to exist. If there is no such observation, i.e., if the node appears in the first observation, this element is set to $-\infty$ since as far as can be told from available data the corresponding object was there from the beginning of time. The second element, $t_{first\ seen}$, is the time of the earliest observation when the node was seen. The third element, $t_{last\ seen}$, is the time of the latest observation in which the node was seen. The final element, $t_{first\ absent}$, is the time of the first observation after the node was seen in which the node was observed to have either changed or disappeared. If there has not been such an observation, the value is set to $+\infty$ since as far as can be determined the node will continue to persist forever. Under this scheme for encoding information about time, in the example GST graph 602 shown, node 464 would have time attribute $(-\infty, 1][2, +\infty)$, node 474 would have time attribute $(-\infty, 1][1, 2)$ and nodes 584-585 would both have time attribute $(1, 2][2, +\infty)$.

Additional GST graph construction techniques suitable to modeling commonly-observed scenes more complex than those shown in the preceding figures may also be employed. In an example, an observed scene may depict an office park or other complex with many parking lots connected by sidewalks. The categorization approach discussed above might recognize these lots and the sidewalks connecting them as a single contiguous region of pavement, and this one large region would then be represented by a single node in a GST graph. However, it may be desirable to represent each of the parking lots in the scene as a separate region with its own characteristics. This separation can be accomplished by the image classification module 116 through morphological erosion and dilation operations applied to the classification images. In the parking lot example, relatively large parking lots are connected by thin sidewalk filaments to create a much larger contiguous region. Applying morphological erosion to the larger region can effectively eliminate the sidewalk filaments while retaining the basic shape of the individual parking lot regions. The image classification module can then perform morphological dilation on the resulting separated parking lot regions to recapture their original size. This technique is useful to isolate the individual members of any group of objects of independent semantic interest connected by thin filament-like regions.

Another common problem observed in constructing GST graphs from remote sensing data is that certain objects like roads, by their very nature, tend to form unbroken, continuous path networks that stretch over a wide area. As a result, these objects will tend to be viewed by the ordinary classification scheme as a single object and be assigned only a single node in the GST graph. Since the useful information about path networks is not just the distance from an object to the path network, an alternative representation of path networks separated into multiple path segment nodes is desirable. In an example, the image classification module may segment a large road network at intersections to create separate nodes for each of the unbroken paths between two intersections. Thus, for example, each of the road segments making up the four sides of a city block would be represented by its own node. Segmenting a road network at intersections works especially well in urban areas where there tend to be many intersecting roadways, but it is to be understood that any method of segmenting a path network can be used where the segmentation recovers path segment features of interest, and also may be applied to various path network object types such as roads, dirt paths, intersecting vehicle tracks, river delta waterways, canals, etc.

The opposite problem also occurs in processing remote sensing data: paths are often separated that should be semantically connected. This may happen for many reasons, including sensor noise, sensor shadows, or occlusions from objects like overhanging trees. For example, a canopy of trees may obstruct a view of a portion of a river, causing the GST graph construction module 120 to interpret the river as two distinct bodies of water rather than a single contiguous path object. To address this problem, the GST graph construction module 120 can construct a correction graph of a potential path object. First, all nodes of the specified path type are added to the graph. For example, in the case of the occluded river mentioned above all water nodes are added to the correction graph. A maximum allowable separation distance between segments of the path, $d_{max}$, is specified, and for all correction graph node pairs a minimum separating distance is calculated. Where the calculated separating distance of a pair of potential path nodes is less than $d_{max}$, an edge connecting the pair of nodes is added to the correction graph. Provided any separation as the result of occlusion, sensor shadow, etc., is less than the defined separation distance $d_{max}$, the correction graph will connect the formerly disjoint path nodes. Additional processing is required to eliminate path cycles that may result from connections satisfying the $d_{max}$ condition but that skip over intermediate path nodes. This is accomplished by walking the list of edges from largest inter-node distance to smallest, and eliminating edges that are part of cycles. This method applies the heuristic that given a choice, a shorter connection between pieces of a path is more likely the true connection than a longer one. Note that the correction graph may be embedded within the main geospatial or GST graph.

A powerful extension of the GST graph concept is the incorporation of information about activity objects into the graph structure. Incorporating activity information into the graph itself allows a user to search very large image datasets for specific sorts of activities of interest, without having to examine multiple image time slices manually. In an example, an analyst can define a search over a GST graph representation of a series of source images seeking to find indications of all vehicles driving from a first building to a second building. In another example, activity information can allow a user to identify churches by identifying parking lots with an increase in cars on Sundays.

Figure 7:
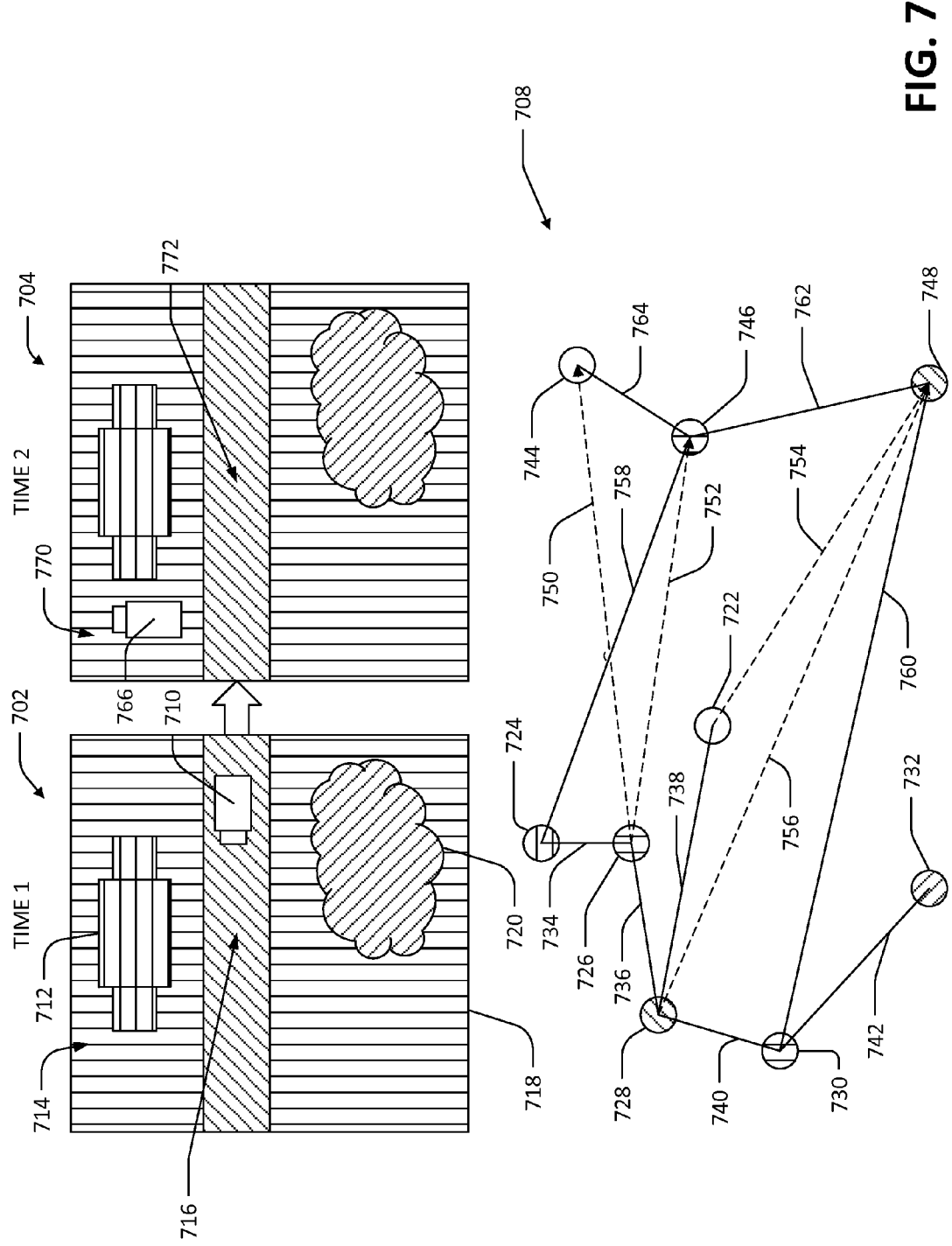
FIG. 7 is an exemplary illustration of a GST graph representation of activity in a series of classification images.

FIG. 7 illustrates a series of classification images 702-704 in which a truck 710 is shown over a period of two observations, and a GST graph representation 708 incorporating the truck sightings as additional nodes. In this activity graph representation, nodes have an additional attribute signifying whether they are durable or ephemeral, e.g., labels that are indicative of whether objects represented by the nodes are expected to change. Ephemeral nodes may correspond to transient natural objects such as clouds, or be indicators of activity such as vehicles or tracks. Ephemeral nodes are further distinguished by the different encoding scheme used to define their time attribute. Since ephemeral nodes are not expected to persist through time like durable nodes are, they are instead associated with a chronology $[t_{min}, t_{max}]$ describing the range of time when the ephemeral object may have appeared.

Referring again to FIG. 7, the first classification image 702 depicts a truck 710 on a roadway 716 near a structure 712, two grass fields 714, 718, and a tree 720. The objects in the image 702 are represented by nodes 722-732 respectively corresponding to the truck 710, the structure 712, the upper grass field 714, the roadway 716, the lower grass field 718, and the tree 720. The undirected edges 734-742 connecting the nodes 722-732 represent the adjacency relationships between the corresponding objects 710-720 in the first classification image 702. The node corresponding to the truck 722 is encoded as an ephemeral node, while the remaining nodes 724-732 are encoded as durable.

Information from the second classification image 704 is then incorporated into the GST graph 708 by adding three nodes 744-748, four directed edges 750-756 representing the changes from the first image 702 to the second image 704, and four undirected edges 758-764 representing adjacency relationships in the second image 704. The activity of the truck 710 has caused a change in the classification of parts of the images from time 1 to time 2. The region of the grass field 714 has now become in the second classification image 704 a vehicle region 766 and a grass field region 770, represented by nodes 744 and 746 respectively. This change through time is represented by the directed edges 750 and 752 linking node 726 at time 1 to nodes 744 and 746 at time 2. Likewise, the region occupied by the truck 710 and the road 716 at time 1 is now occupied solely by the road 772, and the directed edges 754 and 756 represent the change from nodes 722 and 728 at time 1 to node 748 at time 2.

Designating nodes 722 and 744 with the ephemeral attribute allows analysis of activity objects in the images 702 and 704 by examining the graph structure rather than the images directly. This generally allows for faster machine-assisted search of large image datasets for potential signs of activity than analysis of image pixel data. In an example, an analyst can define a search over a large graph seeking information about the activity of all vehicles near buildings. A graph search algorithm can then examine the graph 708 as a subgraph of a much larger dataset, identify the two ephemeral nodes 722 and 744 corresponding to vehicles near buildings, and determine possible paths taken by the candidate vehicle from time 1 to time 2 by analyzing the adjacency and temporal edges linking vehicles to buildings. Ordinarily, of course, an analyst will not know ahead of time what happened to an object of interest through a series of images separated in time. In FIG. 7, for example, the truck 710 observed at time 1 may not be the same truck as the one 766 observed at time 2. If a search over the GST graph reveals that the truck 710 could not have reached the position of the truck 766 in the period between time 1 and time 2, then the search algorithm could determine automatically that the two trucks were not the same without requiring further input from the analyst. Using the GST information encoded in the graph structure, the ephemeral node attribute of activity candidates, and the associated chronology [$L_{min}$, $t_{max}$] of candidate nodes, an algorithm could rule out impossible or improbable activity patterns, such as a vehicle exceeding its top speed to reach the observed point along a particular path or driving through impassable terrain. These activity-based searches can also be used to generate an activity representation 126 (FIG. 1) that can be presented to an analyst on a display 112 for further assessment, allowing GST graph representations of activity to augment rather than replace a human's judgment.

Figure 8:
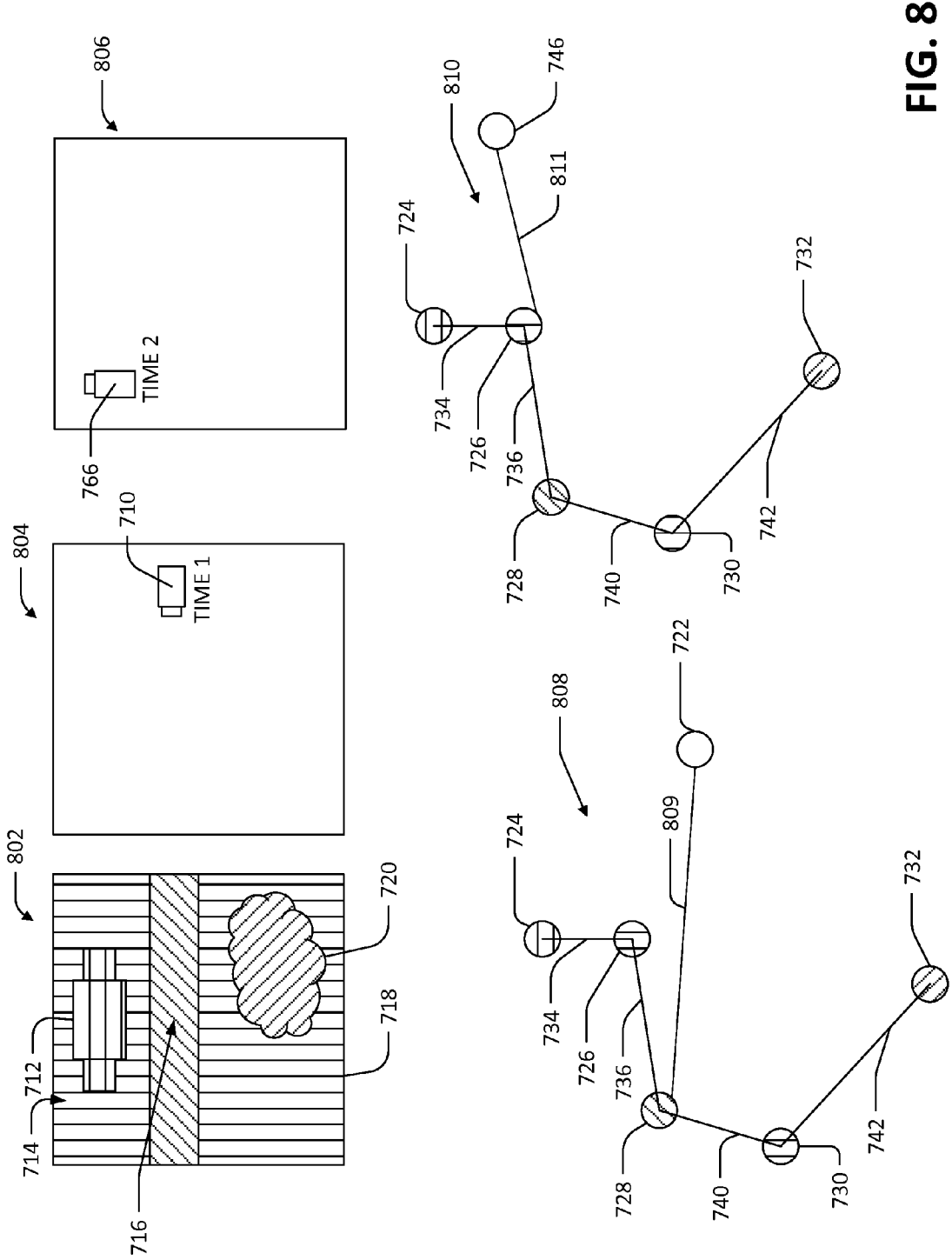
FIG. 8 illustrates another exemplary embodiment for constructing a GST graph.

With reference now to FIG. 8, another exemplary embodiment pertaining to constructing a GST graph is illustrated, where the GST graph is constructed in layers. FIG. 8 depicts images 802, 804, and 806 that are derived based upon the images 702 and 704 set forth in FIG. 7. With more particularity, the image classification module 116 can receive the images 702 and 704, and output the images 802, 804, and 806 based upon the images 702 and 704. The first image 802 represents a background of the scene, where the classification module 116 extracts objects from the images 702 and 704 not found in both images (e.g., the truck(s) 710 and 766) of the scene. The second image 804 illustrates position of a truck 710 at time 1 (when the image 702 was captured), and the third image 804 illustrates position of a truck at time 2 (when the image 704 was captured). Or, images 804, 806 may arrive from separate sources which capture the truck locations at time 1 and time 2. In this embodiment, the GST module 120 can generate a GST graph 804 in layers, where a first layer is formed based upon the images 802 and 804, and a second layer is formed based upon the images 802 and 806. The GST module 120 can then merge the layers to form a GST graph.

With more particularity, the GST module 120 can construct a first layer 808 based upon the images 802 and 804, where the first layer 808 comprises the nodes 724-732 and undirected adjacency edges 734, 736, 740, and 742, which have been described above. The geospatial graph may also include undirected distance edges, which encode distance between non-adjacent objects in the scene. For example, the graph may include an undirected edge between the node 726 and the node 732, where the undirected edge is assigned data that is indicative of distance between the upper grass field 714 and the tree 720. This distance, for example, may represent a closest distance between the upper grass field 714 and the tree 720, a distance between centroids of the upper grass field 714 and the tree 720, a furthest distance between the upper grass field 714 and the tree 714, a median distance between the upper grass field 714 and the tree 720, any other suitable distance metric, or some combination thereof.

The GST construction module 120 may then supplement the first layer 808 with nodes that represent activity objects that appear in the first image 702 (e.g., the truck 710 illustrated in image 804). Continuing with this example, the GST construction module 120 can construct the node 722, which is representative of the truck 710 at time 1. The GST construction module 120 can also construct an undirected edge 809 between the node 722 and the node 728, where the undirected edge 809 is assigned values that are indicative of a distance between the truck 710 and the roadway 716, as well as an amount of overlap between the truck 710 and the roadway 716. As described previously, the GST construction module 120 can construct additional undirected edges between the node 722 and other nodes in the first layer 808, where such edges are assigned values indicative of distance and/or overlap between the truck 710 and other objects in the scene. Because the node 722 represents an object that does not appear across all images of the scene, the GST construction module 120 can assign a label to the node 722 in the first layer 808 that indicates that the node 722 potentially represents an activity object.

The GST construction module 120 can subsequently construct a second layer 810 based upon the image 802 and the image 806. For purposes of explanation, the second layer 810 is illustrated as including the nodes 724-732 and the edges 734, 736, 740, and 742 corresponding thereto; it is to be understood, however, that for sake of computing efficiency the second layer 810 may include only nodes that are not included in the first layer 808. The GST construction module 120 constructs the node 746, which is representative of the truck 766 in the third image 806, and further constructs an undirected edge 811 between the node 746 and the node 726. The GST construction module 120 assigns the undirected edge 811 values that are indicative of distance between the truck 766 and the upper grass field 714 and overlap between the truck 766 and the upper grass field 714. Further, the GST construction module 120 can construct additional undirected edges between the node 744 and other nodes in the second layer 810, where such edges are assigned values indicative of distance and overlap between the truck 766 and other objects in the scene.

Figure 9:
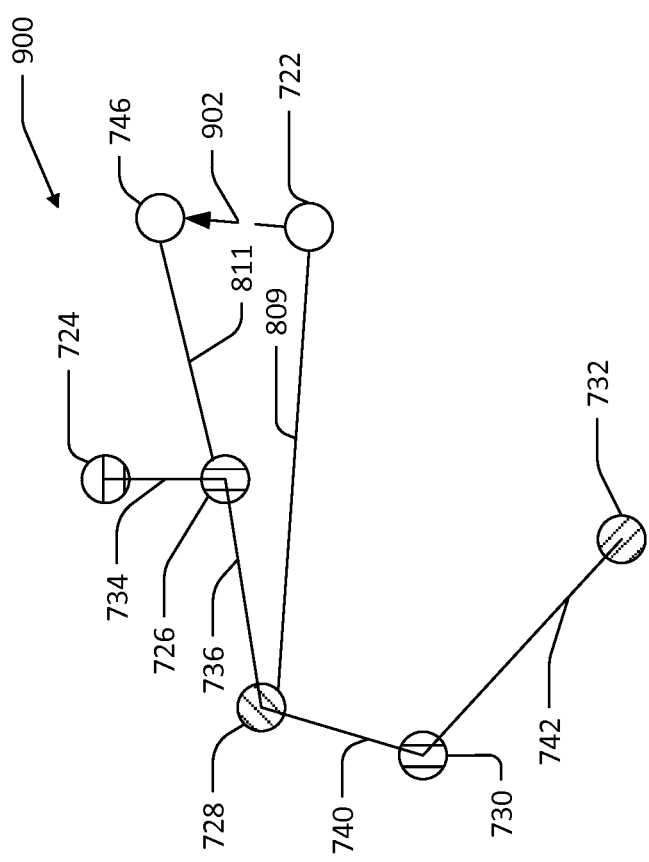
FIG. 9 illustrates an exemplary GST graph.

Now referring to FIG. 9, an exemplary resultant GST graph 900 formed by the GST module 120 by merging the layers 808 and 810 is depicted. The GST graph 900 comprises the nodes 722-732 and 746, as well as the undirected edges 734, 736, 740, 742, 809, and 811. The GST graph 900 additionally optionally comprises a directed edge 902 exiting the node 722 and reaching the node 746, indicating a change over time corresponding to the truck(s) 710 and 766 (presuming that it can be discerned that the trucks 710 and 766 are the same). If no presumption is made that the trucks 710 and 766 are the same, then edge 902 would not be included; in either case, however, the nodes 722 and 746 can be assigned the chronology data described above.

In an alternative embodiment, nodes corresponding to observed activity objects may be added to the GST graph directly. For example, node 746 corresponding to truck 766 observed at time 2 might be added directly to the first layer graph 808. In addition, edge 811 might be directly added, yielding the graph 900. This embodiment allows the final graph 900 to be constructed without an intermediate graph 810 and a merging operation.

Figure 10:
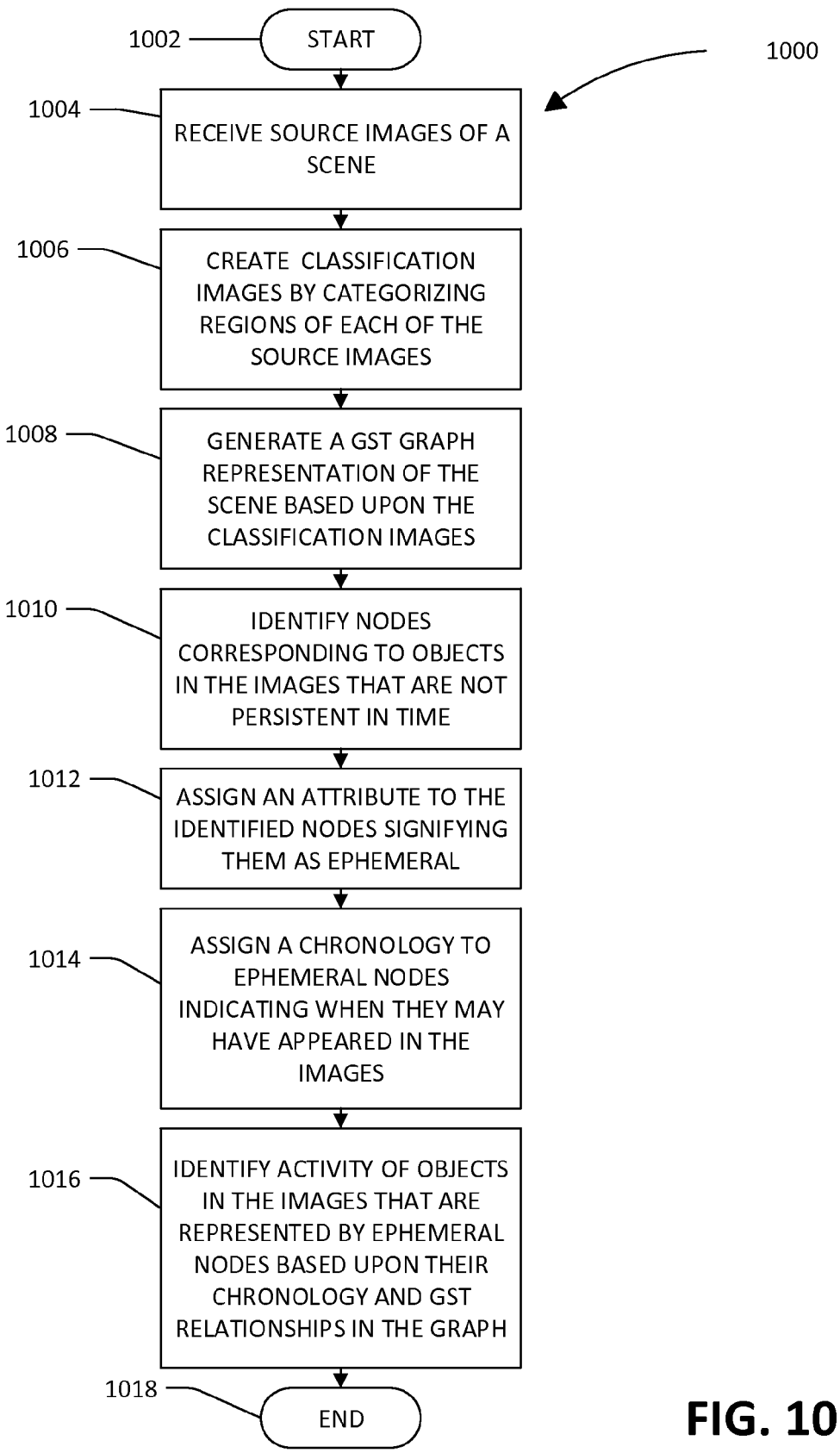
FIG. 10 is a flow diagram that illustrates an exemplary methodology for identifying activity patterns in remote sensing image data of a scene using GST graphs.
Figure 11:
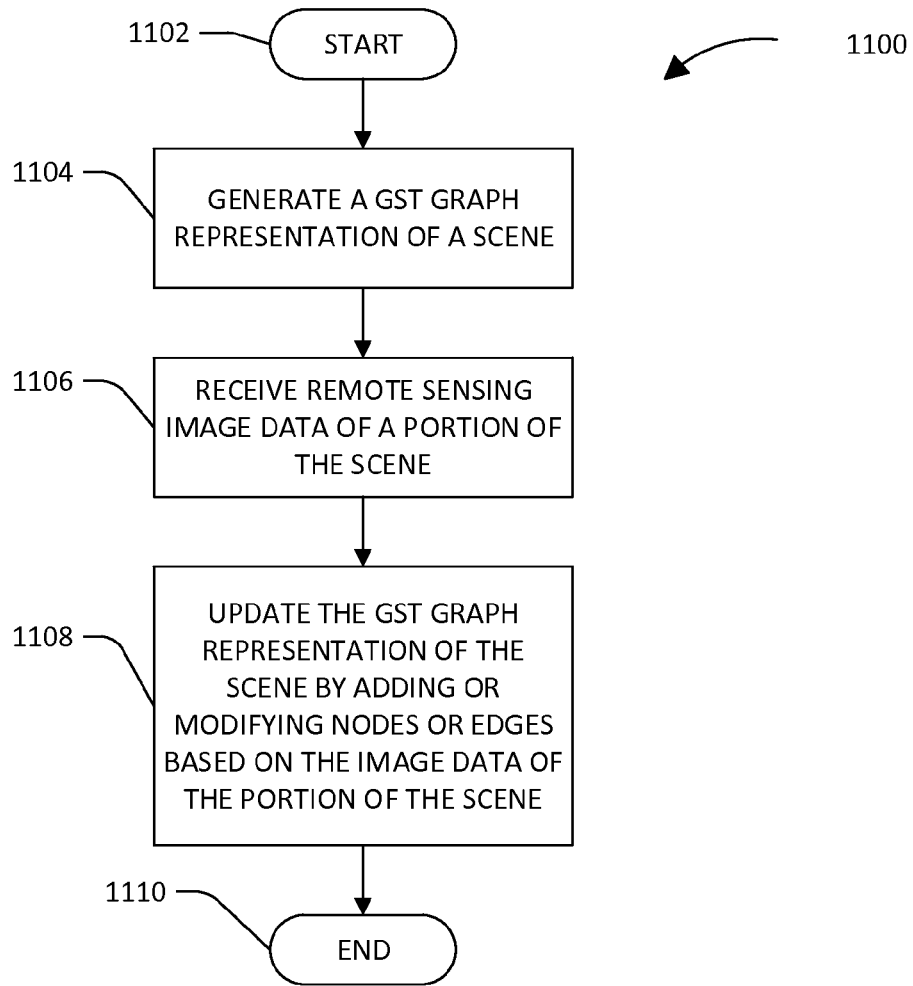
FIG. 11 is a flow diagram that illustrates an exemplary methodology for updating a GST graph representation of a scene based upon receiving additional data about a portion of the scene.

FIGS. 10 and 11 illustrate exemplary methodologies relating to construction of graphs and their use to model patterns of activity in remote sensing images. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 10, a methodology 1000 that facilitates generating a GST graph encoded with activity data is illustrated. The methodology 1000 begins at 1002, and at 1004 a plurality of source images of a scene is received. The source images comprise remote sensing data images of the scene at different points in time. At 1006, a classification image is created from each of the source images. Each classification image encodes information categorizing pixels as belonging to regions of specified types, wherein the regions represent objects depicted in the remote sensing images. A GST graph representation of the scene is constructed at 1006, based upon the classification images. Each region of each classification image is represented by a node, and the nodes are related to one another using undirected edges to represent the distance and/or overlap between the regions or whether they are adjacent, and directed edges to represent a spatial change of a region over time. Directed and undirected edges may also be included to represent other symmetric or asymmetric relationships, respectively. Among the set of nodes in the graph may be nodes that represent objects, for example vehicles or tracks, that are expected to change over time. At 1010 these nodes are identified and at 1012 each of the identified nodes is signified as ephemeral by assigning a node attribute to the identified nodes that is incorporated into the graph data. At 1014 each of the ephemeral nodes is assigned an associated chronology describing a range of time in which the object the node represents may have been present in the scene depicted by the source images, which can be determined based upon the time the object was present in the images themselves. Using the separate categorization of ephemeral nodes, their associated chronology, and GST information represented by the graph structure itself, at 1016 patterns of activity of objects represented by ephemeral nodes may be determined using any suitable graph search techniques, whereupon the methodology ends at 1018.

Referring now to FIG. 11 a methodology 1100 that facilitates incorporating additional GST data into an existing GST graph is illustrated. GST graphs can be employed to represent image datasets of very large areas, for example cities or counties or larger. The image data from which graphs of these areas is generated, though, is often collected in small pieces covering only a portion of the larger area. The methodology 1100 illustrated in FIG. 11 permits a GST graph of a large area to be updated in real time as new data comes in without interfering with graph searches. The methodology begins at 1102, and a GST graph representation of a scene, for example a city, is generated at 1104. At 1106, additional remote sensing image data about a portion of the scene, for example a new image of a neighborhood within the city, is received. The graph is updated with this new information at 1108 by adding new nodes and edges or modifying existing nodes and edges based on the additional data about the scene.

Additionally, GST graph components (e.g., edges and nodes) can be generated in real-time responsive to queries being received, such that components need not be constructed ahead of time. For example, for many types of queries, it is not necessary that all edges between all nodes be constructed. Instead, a type of query may be related to only objects being within a certain distance from one another; accordingly, for sake of computational efficiency, it may be desirable to only construct edges that are pertinent to a received query. To that end, edges of a GST graph can be computed in response to receipt of a query, wherein which edges are computed is a function of the type of the query and its corresponding constraints. The methodology ends 1110.

The steps 1106 and 1108 may be repeated as additional remote sensing image data or other data arrive. Meanwhile, queries can be executed at any time as desired, using the GST graph in its current condition. When more data arrives it is added to the GST graph via steps 1106 and 1108, after which additional queries may be executed.

Figure 12:
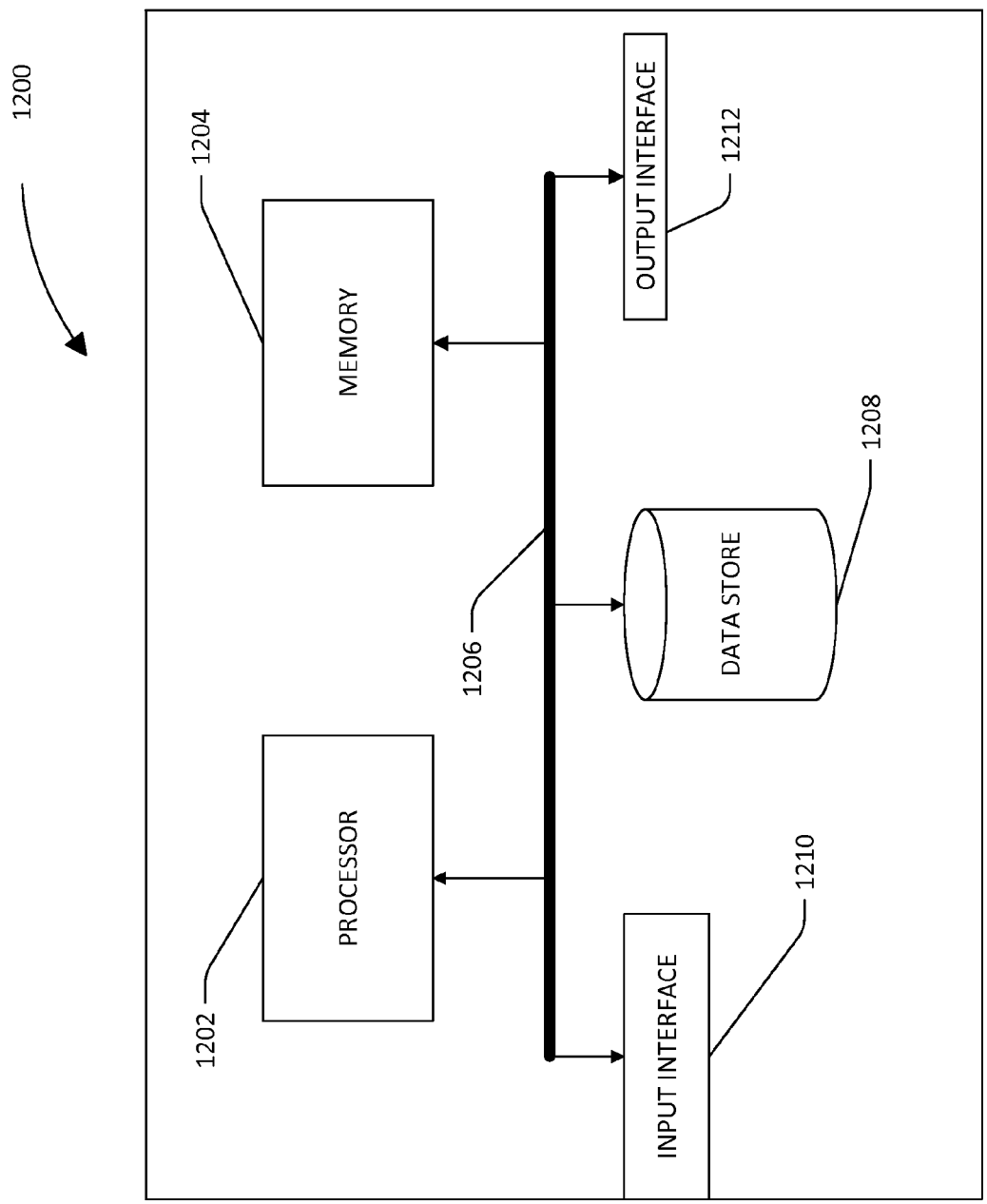
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that generates and displays GST graphs. By way of another example, the computing device 1200 can be used in a system that generates and displays indications of activity in remote sensing images. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store source images 104, classification images, 202, GST graph data 208, etc.

The computing device 1200 additionally includes a data store 1208 that is accessible by the processor 1202 by way of the system bus 1206. The data store 1208 may include executable instructions, images, graph representations, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include code-writing user interfaces, graphical user interfaces, natural user interfaces, and so forth. For instance, a code-writing user interface typically includes a means of writing compute program code to instruct the system to perform desired steps. A graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
   at least one processor; and
   memory that comprises instructions that, when executed by the processor, cause the processor to perform acts comprising:
   assigning classifications to respective portions of a first remote sensing image of a scene captured at a first time and a second remote sensing image of the scene captured at a second time that is subsequent to the first time, the portions representative of objects in the scene captured in the first remote sensing image and the second remote sensing image;
   based upon the classifications assigned to the respective portions, constructing in the memory a geospatial temporal (GST) graph that is representative of the objects in the scene, the GST graph comprises:
     nodes that represent objects captured in at least one of the first remote sensing image or the second remote sensing image, wherein a first node in the nodes is assigned data that indicates that the first node is representative of an object that is expected to change position over time; and
     undirected edges, wherein each undirected edge in the undirected edges couples a respective pair of nodes in the nodes, the undirected edge is assigned data that is indicative of a symmetric relationship between objects in the scene represented by nodes in the pair of nodes; and
   providing the GST to a search system, the GST searchable in response to receipt of a query.

2. The computing device of claim 1, wherein assigning the classifications to the respective portions of the first remote sensing image and the second remote sensing image comprises:
   constructing a first classification image of the scene based upon the first remote sensing image, the first classification image comprises a first plurality of segments; and
   constructing a second classification image of the scene based upon the second remote sensing image, the second classification image comprises a second plurality of segments, wherein each node in the GST graph corresponds to a segment in at least one of the first classification image or the second classification image.

3. The computing device of claim 2, wherein constructing the first classification image comprises segmenting a portion of the first classification image into a plurality of segments based upon the portion of the first classification image being identified as corresponding to a path network object.

4. The computing device of claim 2, further comprising:
   segmenting the first classification image into a plurality of segments; and assigning classification values to respective segments in the plurality of segments, wherein assigning a first classification value comprises:
  performing morphological erosion on a segment to eliminate boundary noise or pixel filament connections to a second segment; and
  performing morphological dilation to the segment to recover an original size of the segment.

5. The computing device of claim 1, wherein the GST graph further comprises a plurality of directed edges, each directed edge in the plurality of directed edges connects a respective pair of nodes in the nodes, each directed edge assigned second data that is indicative of an asymmetric relationship between an object or objects represented by the pair of nodes.

6. The computing device of claim 1, wherein each node in the nodes is assigned data comprising:
  a value that is indicative of a size of an object represented by the node;
  a value that is indicative of a type of the object represented by the node; and
  chronology data that indicates when the object was observed in at least one of the first remote sensing image or the second remote sensing image.

7. The computing device of claim 6, wherein:
  the chronology data assigned to the first node comprises:
    a first time attribute, the first time attribute being an earliest time at which the object represented by the first node potentially existed in the scene; and
    a second time attribute, the second time attribute being a latest time at which the object represented by the first node potentially existed in the scene.

8. The computing device of claim 6, wherein the chronology data assigned to a second node in the nodes comprises values for:
  a first time attribute, the first time attribute being an earliest point in time in which a second object represented by the second node was observed as failing to exist in the scene;
  a second time attribute, the second time attribute being an earliest point in time in which the second object was observed in the scene;
  a third time attribute, the third time attribute being a latest point in time which the second object was observed in the scene; and
  a fourth time attribute, the fourth time attribute being an earliest point in time in which the second object was observed to change in the scene.

9. The computing device of claim 1, the remote sensing image of the scene is based upon at least one of:
  a LiDAR image;
  digital surface model data;
  an RGB+infrared image;
  a synthetic aperture radar image; or
  a GIS image.

10. The computing device of claim 1, wherein the first node is representative of a vehicle or vehicle track captured in at least one of the first remote sensing image or the second remote sensing image.

11. The computing device of claim 1, wherein the nodes of a GST graph are encoded with pointers back to the remote sensing image in which the object was observed.

12. A method, comprising:
  constructing a geospatial temporal (GST) graph in memory of a computing device based upon a remote sensing image of a scene, the remote sensing image of the scene based upon a radar image of the scene, the GST graph comprises:
    a node that is representative of an object captured in the remote sensing image, the node assigned first data that indicates that an object in the scene represented by the node is expected to change position over time, the first data comprises chronology data that indicates an earliest point in time that the object represented by the node potentially first existed in the scene; and
    an edge that couples the node to a second node in the GST graph, the edge assigned second data that is indicative of at least one of:
      a distance between the object represented by the node and a second object represented by the second node; or
      a common overlap area between objects represented by the node and a second node; and
  executing a search over the GST graph in response to receipt of a query to generate an output, the output based upon the data assigned to the node.

13. The method of claim 12, wherein the node is representative of a vehicle or a vehicle track.

14. The method of claim 12, wherein constructing the GST graph further comprises constructing the GST graph based upon a second remote sensing image of the scene, the second remote sensing image of the scene captured subsequent in time to when the remote sensing image of the scene was captured.

15. The method of claim 12, wherein constructing the GST graph further comprises assigning the node a label that is indicative of a type of the object that is represented by the node.

16. The method of claim 12, wherein constructing the GST graph further comprises:
  computing the second data in response to receipt of the query.

17. A computer-readable storage medium comprising instructions that, when executed by a processor, cause the processor to perform acts comprising:
  segmenting a remote sensing image of a scene into a plurality of segments based upon elevation data aligned with the remote sensing image, the remote sensing image of the scene based upon an optical image of the scene;
  constructing a geospatial temporal (GST) graph in memory of a computing device based upon the plurality of segments, the GST graph comprises:
    a node that is representative of an object captured in the remote sensing image, the node assigned first data that indicates that an object in the scene represented by the node is expected to change position over time; and
    an edge that couples the node to a second node in the GST graph, the edge assigned second data that is indicative of a distance between the object represented by the node and a second object represented by the second node; and
  executing a search over the GST graph in response to receipt of a query to generate an output, the output based upon the data assigned to the node.

* * * * *